United States Patent [19]

Shannon

[11] Patent Number: 5,799,147
[45] Date of Patent: Aug. 25, 1998

[54] COMPUTER RECOVERY BACKUP METHOD

[76] Inventor: John P. Shannon, 46 Summer St., Yarmouth Port, Mass. 02675

[21] Appl. No.: 670,873

[22] Filed: Jun. 28, 1996

Related U.S. Application Data

[63] Continuation of Ser. No. 325,485, Oct. 19, 1994, abandoned.
[51] Int. Cl.$^6$ .................................................. G06F 11/00
[52] U.S. Cl. .................. 395/182.04; 395/182.13; 364/286.2; 364/285; 364/943.91
[58] Field of Search ................ 395/182.04, 182.03, 395/182.08, 182.11, 180, 183.17, 600; 364/282.1, 283.1, 268, 268.2, 285, 944.1, 943.91, 974

[56] References Cited

U.S. PATENT DOCUMENTS 5,060,185 10/1991 Naito et al. ..................... 364/943.91
5,434,994 7/1995 Shaheen et al. ..................... 395/600
5,497,483 3/1996 Beardsley et al. ..................... 395/575

Primary Examiner—Hoa T. Nguyen
Assistant Examiner—Trinh L. Tu
Attorney, Agent, or Firm—Richard P. Crowley

[57] ABSTRACT

The invention relates to a computer file backup method, which method comprises providing at least one client computer, such as a personal computer, having a data storage means, such as a hard disk, with data stored thereon, on which data backup protection is desired, and providing at least one separate server computer having a data storage means, such as a hard disk, as a backup computer to receive data from the client computer. The method provides for backing up and periodically updating information on personal computers with the server computer located in a remote geographical location, the computers being connected by a network system.

12 Claims, 2 Drawing Sheets

COMPUTER RECOVERY BACKUP METHOD

REFERENCE TO PRIOR APPLICATION

This application is a continuation of U.S. Ser. No. 08/325,485, filed Oct. 19, 1994 abandoned.

BACKGROUND OF THE INVENTION

In order to recover a computer system, such as a personal computer, from a catastrophic failure of the data storage device, such as a disk, it is not only necessary to replace the hardware, but it is also necessary to be able to restore the data and software configuration. To protect against such loss, it is standard business practice to maintain a backup data storage device set which consists of an up-to-date image of the operating system, applications software and the data files.

In the MS-DOS environment, for example, there are several ways of maintaining backup sets for the purpose of hard disk recovery. Among the most common methods are backing up the entire set to a tape or floppy disk set, maintaining a library of software applications sources and backing up data to tape or floppy disk, creating a shadow image, and peer to peer transmission. These existing methods vary in effectiveness depending on the ability and attention of the user, and the composition and compatibility of the systems involved. Most importantly, existing methods can be interrupted by external disturbances, such as the failure of modems, trees falling on the transmission wires, power failures, and other external factors. (MS-DOS is a trademark of Microsoft, Inc.).

For example, in the process where an entire backup set is maintained, a full image is created on tape or floppy disks, and then, on a daily or periodic basis, those files that have been changed are copied to additional tapes or floppy disks. Using this process, it is possible to restore a data base as of the last incremental backup. A variation calls for a library of applications software sources for restoring the software configuration and then backing up changes in the data on a nightly basis. There are several significant problems commonly associated with this method, primarily the fact that it is people driven, and thus subject to human error. In addition, the magnetic media involved (tape or floppy disk) has a relatively low meantime between failure. Since a backup set consists of many tapes or floppy disks, the probability of failure increases because the failure of one part of the backup set can destroy the integrity of the entire set.

Another problem with this backup method is that the incremental update portions of the set are driven by flags that are modifiable by processes other than the backup data set maintenance process. For example, a user may employ the MS-DOS backup utility rather than the copy-utility to make a floppy disk of a set of files which have been updated to continue working on a different computer. The MS-DOS backup utility will then automatically reset the archive flags indicating that the files have been backed up; and thus the changed filed will not become part of the incremental backup set. Further, some backup applications use the date of the last update as an indicator of files to backup. Files that are copied into directories utilizing the original creation date, rather than the copy date, will not appear on incremental sets. In addition, the date on a vast majority of MS-DOS machines is an unreliable indicator because usually the date is poorly maintained. In fact, on many machines, the date and time stamp will rely on the computer being turned on and off because the clock battery is dead.

Reliance on the maintenance of a floppy disk library of applications software sources presents other risks. For simple software configurations, it offers a satisfactory, albeit time consuming way of recreating the software configuration since it requires the installation of each product in the proper order. In more complicated configurations, and especially those which have migrated through multiple upgrades of software packages, the configuration often is historically dependent. This is due to features that are automatically maintained by the migration from one version of the software package to the next for reasons of compatibility and are handled differently in the new version. That is, the installation of the newest version of all resident software products can result in loss of functionality and/or the ability to access data. Without careful testing, it may be necessary to go back to the initial installation and then perform the subsequent upgrades, which in some instances will be impossible. The problems in maintaining the data backup set are identical to those experienced by backing up the entire set.

Maintaining a shadow set, when the user writes to disk and the system writes to two disks simultaneously, allowing the possibility to switch to the second disk so no data is lost if one disk is lost, requires elaborate fire protection consideration, standby emergency response capabilities, and special hardware/software configurations, all of which are beyond the reach of the ordinary computer user.

Peer to peer reconciliation allows for copying from one disk to another disk sets of files or choosing which file is the newest file and overwriting the older file with the newer file. This process, designed to keep two systems concurrent, is used extensively in the laptop world where the desk top and laptop need to exchange data. It is, however, reliant on operating systems that are compatible and assumes that the files on one computer will be the same as those on the other. This means that in their automatic mode the computer with an older file will be overridden by the computer with the newer file. A computer without a file will have the other computer's file written to it. These and other activities, including deletion of files and restoration of backup files, require human intervention and are subject to failure due to same.

It is desirable to provide for a new and improved computer backup recovery method which can be interrupted at any stage of the method and restarted with absolute certainty as to the state of the image, with a method that accomplishes automatically the check point imaging of a computer's data storage device at a remote location over a network, eliminates human involvement, can be initiated at the convenience of the client, and allows only for the updating of files that have been changed between updates.

SUMMARY OF THE INVENTION

The invention relates to a computer recovery backup method and in particular to a method for backing up and periodically updating information on hard disks in a personal computer with a remote server computer.

The invention relates to a computer file backup method, which method comprises providing at least one client computer, such as a personal computer, having a data storage means, such as a hard disk, with data stored thereon, on which data backup protection is desired, and providing at least one separate server computer having a data storage means, such as a hard disk, as a backup computer to receive data from the client computer.

This computer backup method allows for changing logical file data on the client computer by the computer operator making additions, deletions or other modifications as desired. While other means of storing data, such as random access or solid state devices as well as magnetic or optical disk drives or magnetic or optical drums can be employed, generally a hard disk system as described herein is used.

The method provides for creating a logical disk map of the client computer disk, and connecting the client computer to the server computer. The method further comprises copying a client computer logical disk image, including the logical disk map from the client computer disk, to the disk of the server computer. The method provides for initiating by the client computer operator the updating of the disk map with the new disk map of the client computer, either manually by the computer operator or by a programmed, preselected automatic means, such as a preprogrammed code word or key sequence.

The connection between the client computer and the server computer having been severed, periodic updating of the disk map of the client computer by the computer user takes place, creating a new disk map, with the client computer comparing the disk map with the new disk map to create a list of modified files and removed files, which are themselves included in the list of modified files.

The method the provides for reconnecting the client computer to the server computer, and transmitting, generally by a publicly switched telecommunications network system, the modified files only from the disk of the client computer to a disk data cache on the server computer disk over the connection. Transferring of the data files from the disk data cache on the server disk to the server logical disk image is initiated, and the files identified as removed from the client disk are removed from the server logical disk image.

After completing the backup transmission, the client computer is notified of the update completion and the transmission connection between the client computer and the server computer is terminated.

In almost all business applications, the number of data files changed in the course of a business day is a small percentage of the total files resident on any computer hard disk. With recent advances in networking technology, it is now possible to be able to transmit the amount of data necessary to maintain a remote image over the public network with a very high probability of completion. That is, the length of transmission can now be a significantly small portion of the network meantime between failure. Thus, the maintenance of an image on a highly reliable medium such as hard disk on a server computer at a remote location is now technically possible. Unlike other personal computer backup methods which rely on a file by file transfer, the invention is a disk image update method. It can be interrupted at any point and restarted with absolute certainty as to the state of the image.

The method of the invention accomplishes automatically the logical check point imaging of a computer's hard disk at a remote location over the public telecommunications network. A remote image reduces the potential loss due to fire and theft and does not require the elaborate procedures involved with physically moving by person the removable media or the maintenance of on-site, fire proof, theft-proof storage.

The backup method as described has the advantage of eliminating the human involvement, which is the highest point of failure in other backup methods. It is a hard disk-to-disk method, and there is no physical library to maintain, since the hard disk logical image is always complete on a high reliability medium. In the event of a failure to the backup medium, which is a high visibility event, recreation of the check point image is a simple, straight forward method since the image is always available from the primary source. If a recovery from multipoint failure is required, simple disk-to-disk copy at the remote site in a different geographical area can be implemented.

It is also possible, with this invention, to incorporate more than one remotely located server computer as desired by the computer user, and more than one client computer may be connected to the server computer or computers.

The method of the invention is designed to be totally driven by the client-user's computer and at the convenience of the client-user. This insures that the client-user is not exposed to outside agents remotely accessing the client-user's computer, since the client-user may maintain an originate-only mode of operations. It also allows the client-user to vary the onset of the method steps in conjunction with the client-user's business schedule. Provisions are available to encript the files on the remote image and all subsequent updates.

The computer file recovery backup method of the invention may be employed with a wide variety of software, and is hardware and software independent, and in one embodiment is implemented with an IBM compatible personal computer running MS-DOS version 6.0, from Microsoft, Inc. The networking package is Procom Plus, Version 2.01, from Datastorm Technologies, Inc. There are five software modules, three for the client and two for the server, that were written to implement the process. The control and sorting modules are written in Pascal, and the networking modules are written in Aspect Script, which is programming language designed for use with Procom Plus. The Server modules are SERVER.PAS and SERVER.ASP. The client modules are PCD.PAS, PCD.ASP and the sorting algorithm TRAX.PAS.

The method of the invention will be described for the purposes of illustration only in connection with certain embodiments; however, it is recognized that various modifications, changes, additions and improvements may be made to the illustrated embodiments by those persons skilled in the art all falling within the spirit and scope of the invention.

DESCRIPTION OF THE EMBODIMENTS

Figure 1:
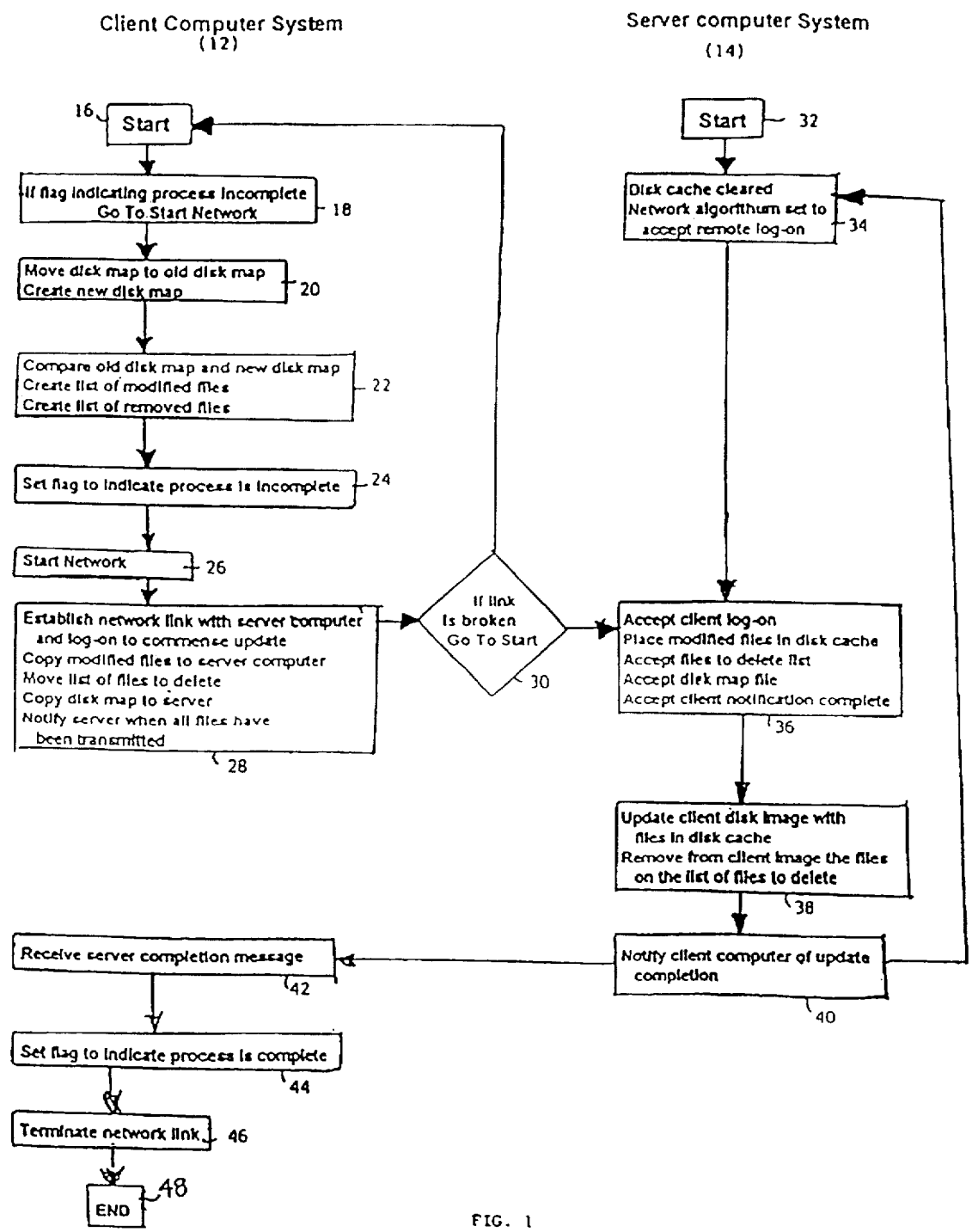
FIG. 1 is a schematic illustrative flow diagram of the computer recovery backup method of the invention.

FIG. 1 shows the computer recovery backup method of the invention 10 with a client computer 12 and a server computer 14, illustrated with the hard disk method. Initiating the client computer 12 takes place at point 16, proceeding to an incomplete process indicator flag 18, being connected to the new logical disk map creating step 20. Comparing the new logical disk map and logical disk map occurs at point 22, creating a list of modified and removed files, and a flag 24, indicating if the process is incomplete, is positioned at the starting point of the network 26. The network starting point 26 is also connected to the flag 18 indicating the process is incomplete.

The network link with the server computer system 14 occurs at point 28, commencing the log-on for the updating and copying of the modified files and the updated disk map to the server computer. A link break protection feature, located at point 30, provides for restarting the process at point 16 if the link is broken. The server computer 14, starting at point 32, and clearing the cache disk at point 34, accepts and sets the client computer log-on at point 36, placing the modified logical files in the server disk data cache, updating the files and accepting the logical disk map file. At this point, after notifying the client computer, step 38 consists of updating the client disk image with the files in the disk data cache of the server computer. Next, removing the files o the list of files to delete from the client computer logical disk image and notifying the client computer of the update completion occurs at step 40. The client computer 12, upon receiving the server completion message at point 42, sets the flag 44, indicating that all steps have been completed, said completion terminating the network link at point 46 and ending the process at point 48.

Figure 2:
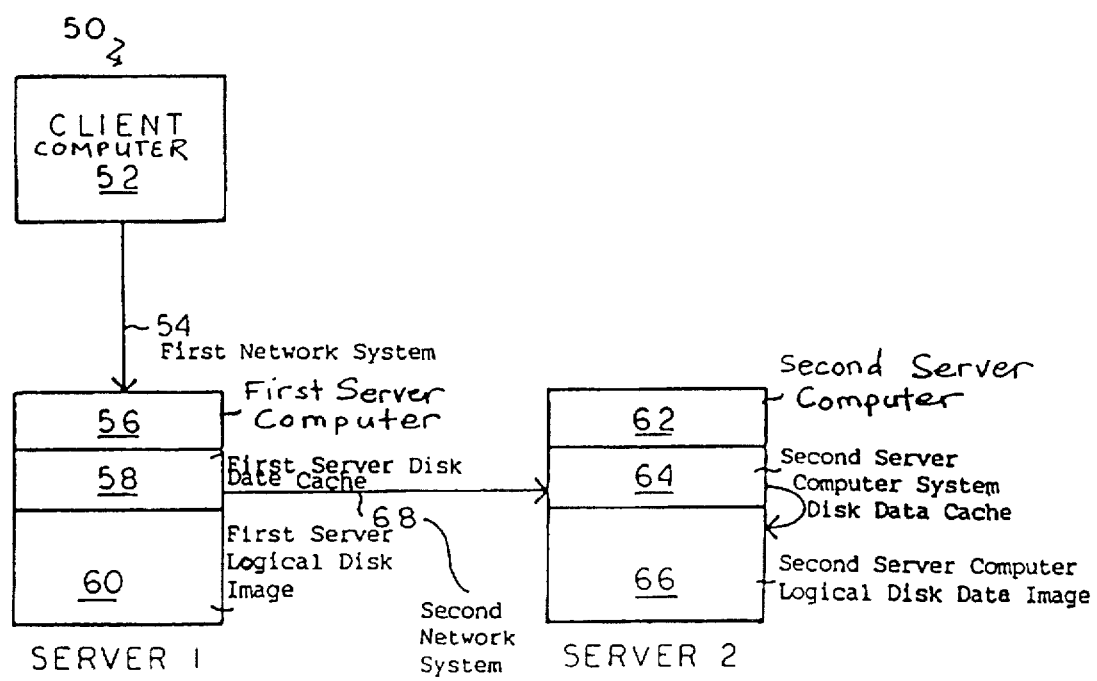
FIG. 2 is a schematic illustration of the computer recovery backup method of the invention in use with one client and two server computers.

FIG. 2 is a schematic illustration of a computer recovery backup method 50 shown in operation with two server computers. The method provides for the linking of the client computer 52 by a network system 54 to the first server computer 56, where the updated client files are entered into the first server disk data cache 58. The first server computer, being linked to a second server computer 62 by means of a second network system 68, transfers the information from the first server disk data cache 58 to the second server computer system disk data cache 64. The method provides for filing the updated disk data cache files into the logical disk data image of the second server computer 66.

It should be noted that if only one server computer is desired, only the logical disk data image 60 on the first server computer system 56 would be employed, and the network link 68 and second server computer system 62 would not be utilized.

In operation, the method of the invention comprises maintaining a data file, said data file reflecting a complete logical disk map of the client disk at the time of the last update, and creating a new logical disk map at the next scheduled time of the updating. The method includes comparing the new disk map to the disk map, and if any of the attributes of a file have changed, the file is listed as modified and will be transmitted to the remote server computer disk image. Attributes relating to the physical drive are not used. The method provides for deleting any file on the disk map that is not on the new disk map, creating a file of files to be deleted for transmitting to the server computer, to be used for removing so designated files from the server computer logical disk image.

After completing this process, the method provides for establishing a network connection with the server computer maintaining the remote disk image, transmitting all the files flagged for update, including the file of files to be removed and both disk image and new disk image files and placing all these files in a cache directory. Only after the transmitting of all files is completed and said completion is indicated by the client computer does the server computer copy the updated files from the data cache directory into the server computer disk image. Files listed for deleting are removed from the server computer disk image.

After processing all updates into the server computer disk image, the server computer signals to the client computer that the updating is complete, replacing the logical map with the new logical map on the client computer. The client computer then clears the file that says the update is in progress, terminating the network connection.

The method provides for protecting the updating by restarting automatically from the beginning the total incremental updating method if the network transmission is interrupted. The restarting method will continue until the client computer clears the file that says the update is in progress. Creating a new logical disk map is impossible until all of the logical disk map has been successfully updated. This is done to insure that the updating is accurate and complete and no assumption is made regarding the accuracy or completeness of any partial transmission.

The method, being completely stand-alone, does not rely on operating system-specific features, all operating systems having a minimum set of the attributes as part of their file directory structure. The remote backup method, always having a logical disk map of the entire client disk, provides for matching the logical image directory to the logical client directory and identifying any discrepancies.

The recovery backup computer method as described and illustrated thus provides for a reliable, accurate and efficient method for the protection of computer data that can be used in a variety of situations as required by the computer user or users.

What is claimed is:

1. A computer file data backup method which comprises:
   a) providing at least one client computer having a client disk image composed of a plurality of client data files, having a set of selected attributes, on a client computer storage means;
   b) providing by the client computer a client disk map composed of the attributes of the client data files;
   c) providing a separate server computer adapted to be connected periodically to said client computer and having server computer storage means only to receive, and to store said client disk image as a client logical disk image;
   d) transmitting from said client computer by a client said client disk image in logical form into said server computer storage means to provide a stored client logical disk image;
   e) updating periodically by the client in said client computer said client disk map by comparing said client disk map with the previous client disk map to identify any client data file with additions, modifications or deletions occurring since the last update of the previous client disk map to provide a revised client disk map;
   f) transmitting from the client computer and only receiving and storing in said storage means of said server computer, the added or modified client data files and removing said deleted client data files to provide a revised updated client logical disk image;
   g) acknowledging between said server computer and client computer the completing of the transmission;
   h) storing in said server computer said revised updated client logical disk image; and
   i) disconnecting the transmission link between said server computer and said client computer until the next client-initiated updating of said revised updated client logical disk image.

2. The method of claim 1 which includes manually initiating by a client user said updating, identifying and transmitting of said revised updated client logical disk image.

3. The method of claim 1 which includes preselecting, programming, automatically transmitting and storing of said client computer revised updated client logical disk image.

4. The method of claim 1 which includes transmitting between said client computer and said server computer by a public-switched telecommunications network system.

5. The method of claim 1 which includes positioning a plurality of client computers at separate geographical locations from said server computer, and providing transmission-connecting means between said client computer and said server computers.

6. The method of claim 5 wherein said client or server computers are selected from the group consisting of personal computers, laptop computers, and other storage means computers or combinations thereof.

7. The method of claim 1 wherein said client computer or said server computer includes optical or magnetic hard disks as said computer storage means.

8. The method of claim 1 which includes recovering by said client computer from said server computer storage means the last revised, updated client logical disk image from said server computer.

9. The method of claim 1 which includes auditing periodically by said server computer said stored, last revised, updated client logical disk image in said server computer.

10. The method of claim 1 which includes preventing the storing of the revised, updated client disk image, until all said modifications, additions and deletions have been completely transmitted and stored in said server computer storage means.

11. The method of claim 10 which includes, on interrupting of the transmitting step to said server computer, restarting automatically from the beginning of the transmitting step, and repeating the transmitting step to said server computer of said updated, revised client disk image.

12. A computer file data backup method which comprises:
    a) providing a plurality of client computers at separate geographical locations on which backup protection is desired, each client computer having a client disk image composed of a plurality of client data files on a client computer storage means;
    b) providing by each client computer a client disk map composed of attributes of the client data files;
    c) providing a separate server computer adapted to be connected periodically to each of said client computers and having server computer storage means only to receive, and to store said client disk image of each client computer as a client logical disk image;
    d) transmitting periodically from each client computer by a client said client disk image of said client computer in logical form into said server computer storage means to provide a stored client logical disk image;
    e) updating periodically by the client, manually or automatically, in each of said client computers said client disk map by comparing said client disk map with the previous client disk map in said client computer to identify any client data file with additions, modifications or deletions occurring since the last update of the previous client disk map of said client computer to provide a revised client disk map;
    f) transmitting as initiated by the client from each of the client computers by a telecommunication network system and receiving and storing in said storage means of said server computer, only the added or modified client data files and removing said deleted client data files to provide a revised updated client logical disk image;
    g) acknowledging between said server computer and client computers the completing of the transmission to said client computer;
    h) storing in the server computers the revised updated client logical disk image for said client computer; and
    i) disconnecting the transmission link between said server computer and each of said client computers until the next client-initiated updating of said updated revised client disk image.

* * * * *